United States Patent Office 2,826,588
Patented Mar. 11, 1958

2,826,588
1,3-DI-SUBSTITUTED PYRROLIDINE COMPOUNDS

Rolland Frederick Feldkamp and Yao Hua Wu, Evansville, Ind., assignors to Mead Johnson & Company, Evansville, Ind., a corporation of Indiana No Drawing. Application October 14, 1955
Serial No. 540,604

11 Claims. (Cl. 260—313)

This invention relates to 1,3-di-substituted pyrrolidine compounds and has particular reference to compounds related to pyrrolidine containing the radical

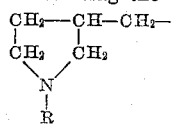

in which R represents an alkyl, alkenyl, aryl or aralkyl group.

This invention has more particular reference to those compounds having the formula

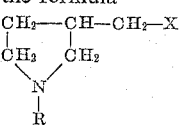

wherein X represents a hydroxyl or halogen group and wherein R represents an alkyl, alkenyl, aryl or aralkyl group. These compounds are useful as intermediates in the preparation of derivatives having pronounced physiological activity. Thus as to those compounds having the above indicated formula where X is a hydroxyl group, the compounds may be esterified with benzilic acid to form compounds having marked antispasmodic activity. As to compounds having the above indicated formula where X represents a halogen, the compounds may be used to prepare phenothiazine derivatives having a marked antihistaminic activity as well as some antispasmodic activity.

In accordance with this invention, the 1-substituted-3-pyrrolidylmethyl alcohols having the formula

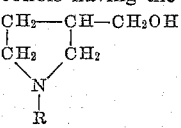

may be prepared by reacting esters of itaconic acid with a suitable organic primary amine whereby to form a 1-substituted-3-carboalkoxy-5-pyrrolidinone by ring closure. The substituent in the 1 position in the ring will be governed by the particular primary amine selected, representative primary amines being methylamine, ethylamine, n-propylamine, isopropylamine, allylamine, butylamine, aniline, benzylamine or the like. The substituted pyrrolidinone is then completely reduced with a strong reducing agent, such as lithium aluminum hydride, in order to produce a carbinol having the generic formula above indicated. These carbinols may be esterified by conventional methods with such organic acids as benzilic acid or the like to produce compounds having high antispasmodic activity, all as disclosed in our copending application Serial No. 540,606, filed of even date herewith.

In order to produce the corresponding halides, the carbinols previously indicated may be reacted with a thionyl halide to form the 1-substituted-3-pyrrolidylmethyl halides. These methyl halides may be reacted with an amine, such as phenothiazine, to produce a compound having antispasmodic activity and an unexpectedly high antihistaminic activity, all as disclosed in our copending application Serial No. 540,605, filed of even date herewith.

For a more complete understanding of this invention, specific examples are here given which more fully disclose the compounds contemplated within the scope of this invention and their method of preparation.

1-ETHYL-3-CARBOMETHOXY-5-PYRROLIDINONE

A solution of 158 parts of dimethyl itaconate (commercially available) in 10 parts of anhydrous methanol was added with stirring and at such a rate to a cooled solution of 54 parts of ethylamine in 70 parts of anhydrous methanol, to maintain a reaction temperature of $5\pm2°$ C. When the addition was complete, the orange-red reaction mixture was allowed to warm up to room temperature with stirring. After standing overnight, the solvent was removed by distillation and the residual oil fractionated under reduced pressure. Yield of the substituted pyrrolidinone was 156 parts.

1-ETHYL-3-PYRROLIDYLMETHYL ALCOHOL

A solution of 171 parts of 1-ethyl-3-carbomethoxy-5-pyrrolidinone in 108 parts of anhydrous ether was added slowly to a partial solution of 54 parts of powdered lithium aluminum hydride in 600 parts of ether. The addition was made over a period of 4–5 hours with efficient stirring so as to maintain a moderate reflux rate. When the addition was complete, refluxing and stirring were continued for 2 hours, after which the reaction mixture was left overnight at room temperature. The white lithium aluminum complex was decomposed by the slow addition of 77 parts of water and sufficient additional ether to permit efficient stirring. The resulting thick slurry was stirred for an hour and then filtered by suction. This ether filtrate was set aside while the cake was completely extracted in a Soxhlet type apparatus with anhydrous ethanol. After combining the ether and alcoholic filtrates, the solvents were removed by distillation and the thick residual oil fractionated under reduced pressure. Yield of the substituted alcohol was 94.5 parts.

1-ETHYL-3-PYRROLIDYLMETHYL CHLORIDE

A solution of 129.2 parts of 1-ethyl-3-pyrrolidylmethyl alcohol in 450 parts of chloroform was saturated with hydrochloric acid gas. The brown colored two phase mixture was then heated to refluxing and slowly treated with a solution of 240 parts of thionyl chloride in 450 parts of chloroform. When the addition was complete, refluxing was continued for an hour. After standing overnight, the excess thionyl chloride and solvent were partially removed by distillation and completely by two successive distillation washes with 200 parts of anhydrous ethanol. The residue was dissolved in 300 parts of water and all insoluble material completely removed from the solution by extraction with isopropyl ether. This acidic aqueous solution was made strongly basic with potassium hydroxide liberating the free basic chloride as an oil. The oil was extracted with ether and the extract dried with anhydrous magnesium sulfate. After filtration, all solvent was removed by distillation and the residual oil fractionated under reduced pressure. Yield of the chloride was 117 parts as a water clear oil.

In the foregoing examples the preparation of the 1-ethyl compounds is specifically disclosed. The method outlined is equally applicable to the other 1-substituted derivatives comprehended within the scope of this invention and a number of such compounds have been prepared utilizing the same methods and essentially the same molar ratio of reactants. Thus, as the following tables will indicate, the corresponding methyl, n-propyl, isopropyl, allyl, butyl, benzyl and phenyl derivatives have been prepared.

In Table I are presented the physical properties and analyses of a number of 1-substituted-3-carboalkoxy-5-pyrrolidinones prepared in accordance with the procedure indicated above.

Table I.—*1-substituted-3-carboalkoxy-5-pyrrolidinones*

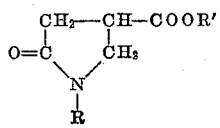

| R | R' | B. P., °C. | P, mm. | $n^{25}$ | Carbon | | Hydrogen | |
|---|---|---|---|---|---|---|---|---|
| | | | | | Calcd. | Found | Calcd. | Found |
| $CH_3-$ | $C_2H_5$ | 166–167 | 19.0 | 1.4678 | 56.13 | 56.68 | 7.65 | 7.82 |
| $C_2H_5-$ | $CH_3$ | 104–106 | 0.13 | 1.4702 | 56.13 | 56.21 | 7.65 | 7.35 |
| $C_3H_7-$ | $CH_3$ | 91.5–92 | 0.08 | 1.4688 | 58.36 | 57.82 | 8.16 | 7.82 |
| i—$C_3H_7-$ | $CH_3$ | 86–88 | 0.06 | 1.4665 | 58.36 | 58.60 | 8.16 | 8.12 |
| $CH_2=CH-CH_2-$ | $CH_3$ | 178–179 | 21.0 | 1.4829 | 59.00 | 59.40 | 7.15 | 6.84 |
| $C_4H_9-$ | $CH_3$ | 180–182 | 18.0 | 1.4682 | 60.28 | 60.80 | 8.60 | 8.63 |
| $C_6H_5-CH_2-$ | $CH_3$ | [1] 64–65 | | | 66.93 | 67.30 | 6.48 | 6.38 |
| $C_6H_5$ | $CH_3$ | [1] 71–73 | | | 65.74 | 65.80 | 5.98 | 5.87 |

[1] Melting point, ° C.

In Table II are presented the physical properties and analyses of a number of 1-substituted-3-pyrrolidylmethyl alcohols prepared in accordance with the procedure given above for the preparation of the ethyl derivative.

Table II.—*1-substituted-3-pyrrolidylmethyl alcohols*

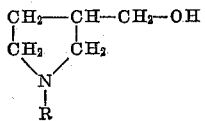

| R | B. P., °C. | P, mm. | $n^{25}$ | Carbon | | Hydrogen | |
|---|---|---|---|---|---|---|---|
| | | | | Calcd. | Found | Calcd. | Found |
| $CH_3-$ | 94–96.5 | 15.0 | 1.4662 | 62.59 | 62.27 | 11.37 | 11.19 |
| $C_2H_5-$ | 110–111 | 20.0 | 1.4693 | 65.07 | 65.34 | 11.70 | 11.86 |
| $C_3H_7-$ | 122–126 | 24.0 | 1.4669 | 67.08 | 67.05 | 11.97 | 11.75 |
| i—$C_3H_7-$ | 122–122.5 | 24.0 | 1.4713 | 67.08 | 67.15 | 11.97 | 11.61 |
| $CH_2=CH-CH_2-$ | 122–124 | 21.0 | 1.4822 | 68.04 | 68.22 | 10.71 | 11.01 |
| $C_4H_9-$ | 130–131 | 19.0 | 1.4672 | 68.74 | 69.39 | 12.9 | 12.14 |
| $C_6H_5-CH_2-$ | 166–168 | 12.0 | 1.5431 | 75.35 | 75.29 | 8.96 | 8.89 |
| $C_6H_5$ | 130–135 | 0.05 | 1.5872 | 74.54 | 74.56 | 8.53 | 8.39 |
| | [1] 54–55 | | | | | | |

[1] Melting point, ° C.

In Table III there are presented the physical constants and the analyses of the various 1-substituted-3-pyrrolidylmethyl chlorides that have been prepared in accordance with the procedure given above in connection with the preparation of the 1-ethyl derivative.

Table III.—*1-substituted-3-pyrrolidylmethyl chlorides*

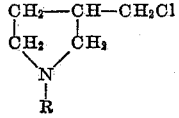

| R | B. P., °C. | P, mm. | $n^{25}$ | Chlorine Analyses | |
|---|---|---|---|---|---|
| | | | | Calcd. | Found |
| $CH_3-$ | 75–76 | 35 | 1.4608 | 26.53 | 26.86 |
| $C_2H_5-$ | 86–88 | 36 | 1.4611 | 24.02 | 23.67 |
| $C_3H_7-$ | 89–90 | 19 | 1.4611 | 21.93 | 22.03 |
| i—$C_3H_7-$ | 90–91 | 24 | 1.4630 | 21.93 | 21.89 |
| $CH_2=CH-CH_2$ | 90–91 | 14 | 1.4755 | 22.21 | 22.36 |
| $C_4H_9-$ | 108–110 | 20 | 1.4615 | 20.18 | 20.14 |
| $C_6H_5-CH_2-$ | 165–167 | 19 | 1.5346 | 16.91 | 17.02 |

As previously indicated, the substituted group in the 1 position may be alkyl, alkenyl, aryl or aralkyl and will usually contain less than about 10 carbon atoms. However, it will be readily apparent that any substituent group may be comprehended within the scope of this invention which forms a part of a primary amine which will affect ring closure with an ester of itaconic acid. In the foregoing description the dimethyl ester of itaconic acid has been particularly specified as one of the starting compounds but it will be readily aparent to one skilled in the art that other esters may be employed, such as the diethyl, di-n-propyl, di-isopropyl, dibutyl and the like.

In connection with the preparation of the 1-substituted-3-pyrrolidylmethyl chloride as above indicated, it will be readily appreciated that other halides may be obtained by methods similar to that indicated above except that the appropirate thionyl halide is employed in place of the specifically designted thionyl chloride. Thus the corresponding thionyl bromides or iodides my be similarly used to prepare the corresponding substituted 3-pyrrolidylmethyl bromides or iodides.

It will be appreciated from the foregoing considerations that a new class of chemical compounds has been produced in accordance with this invention and, as will be apparent from our copending applications Serial Nos. 540,605 and 540,606, these compounds have particular utility as intermediates in the synthesis of other compounds having pronounced physiological activity. Reference has been made to a number of specific compounds per se but it will be readily apparent that the simple acid addition or quaternary ammonium salts of these compounds also fall within the scope of this invention. Suitable acid addition salts are those of organic or inorganic acids, such as hydrochloric acid, hydrobromic acid, hydroiodic acid, sulfuric acid, phosphoric acid, maleic acid, acetic acid, citric acid, succinic acid, tartaric acid and the like. Suitable quaternary ammonium salts of these compounds are those formed by the addition to the basic compounds of such compounds as methyl chloride, bromide or iodide, ethyl bromide, propyl chloride, benzyl chloride, benzyl bromide, methyl sulfate, methyl benzenesulfonate, methyl-p-toluene sulfonate or other alkyl or aralkyl esters of inorganic acids or organic sulfonic acids.

While particular embodiments of this invention are

We claim:

1. A 3-substituted pyrrolidine compound having the formula

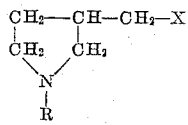

wherein X is selected from the group consisting of hydroxyl and a halogen and wherein R is selected from the group consisting of lower alkyl, lower alkenyl, monocyclic aryl and phenyl lower alkyl.

2. The compound recited in claim 1 wherein R is methyl.
3. The compound recited in claim 1 wherein R is ethyl.
4. The compound recited in claim 1 wherein R is isopropyl.
5. The compound recited in claim 1 wherein R is benzyl.
6. The compound recited in claim 1 wherein R is allyl.
7. 1-lower alkyl-3-pyrrolidylmethyl alcohol.
8. 1-lower alkyl-3-pyrrolidylmethyl chloride.
9. 1-monocyclic aryl-3-pyrrolidylmethyl alcohol.
10. 1-monocyclic aryl-3-pyrrolidylmethyl chloride.
11. A process of preparing a compound having the formula

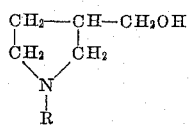

wherein R is from the group consisting of lower alkyl, lower alkenyl, monocyclic aryl and phenyl lower alkyl which comprises reacting an ester of itaconic acid with an organic amine having the formula $RNH_2$ and subjecting the reaction product to lithium aluminum hydride whereby to form the desired compound.

References Cited in the file of this patent

UNITED STATES PATENTS 2,708,194    Blicke ---------------- May 10, 1955

OTHER REFERENCES

Beilstein: Hand. Org. Chem., 4th ed., Band XXI, 1st Suppl., pp. 189–190.
J. A. C. S., vol. 60, pp. 402–6 (1938).
J. A. C. S., vol. 73, pp. 2402–2403 (1951).
Chem. Abs., vol. 45, p. 10237f (1951).